United States Patent
Choi et al.

(10) Patent No.: US 8,477,450 B2
(45) Date of Patent: Jul. 2, 2013

(54) BASE FOR MOTOR AND HARD DISK DRIVE INCLUDING THE SAME

(75) Inventors: Tae Young Choi, Gyunggi-do (KR); Hyun Ho Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/417,860

(22) Filed: Mar. 12, 2012

(65) Prior Publication Data

US 2013/0135770 A1     May 30, 2013

(30) Foreign Application Priority Data

Nov. 29, 2011  (KR) .................. 10-2011-0125635

(51) Int. Cl.
*G11B 17/02* (2006.01)

(52) U.S. Cl.
USPC ....................................................... 360/99.16

(58) Field of Classification Search
USPC .......... 360/97.11, 97.12, 97.13, 97.14, 97.15, 360/97.16, 97.2, 97.21, 264.2, 246.1, 265.5, 360/99.16, 99.08
See application file for complete search history.

(56) References Cited

U.S. PATENT DOCUMENTS

| 4,843,511 | A  | * | 6/1989 | Downey ........................ 360/133 |
| 5,796,696 | A  | * | 8/1998 | Shigenai et al. .............. 720/677 |
| 6,399,179 | B1 | * | 6/2002 | Hanrahan et al. ............. 428/131 |
| 6,690,539 | B2 | * | 2/2004 | Gallo et al. ................. 360/97.11 |
| 6,862,738 | B2 | * | 3/2005 | Wu et al. ...................... 720/651 |
| 8,194,346 | B2 | * | 6/2012 | Kubo .......................... 360/97.19 |
| 8,230,453 | B2 | * | 7/2012 | Kusumi ........................ 720/647 |
| 2008/0012443 | A1 |  | 1/2008 | Tamaoka et al. |
| 2010/0118437 | A1 | * | 5/2010 | Kong et al. ................. 360/97.02 |
| 2011/0007419 | A1 | * | 1/2011 | Kubo ......................... 360/97.01 |

FOREIGN PATENT DOCUMENTS

JP        2008-5623       1/2008

* cited by examiner

*Primary Examiner* — Allen T Cao

(57) ABSTRACT

There is provided a base for a motor, the base including: a base body having a disk disposed thereon; an outer wall part defining an outer part of the base body; and at least one rib depressed from one surface of the base body and protruded toward the other surface thereof to thereby improve rigidity of the base body, wherein pressure in an inner edge of the rib is equal to or greater than pressure in an outer edge thereof at the time of rotation of the disk.

16 Claims, 8 Drawing Sheets

BASE FOR MOTOR AND HARD DISK DRIVE INCLUDING THE SAME

CROSS-REFERENCE TO RELATED APPLICATIONS

This application claims the priority of Korean Patent Application No. 10-2011-0125635 filed on Nov. 29, 2011, in the Korean Intellectual Property Office, the disclosure of which is incorporated herein by reference.

BACKGROUND OF THE INVENTION

1. Field of the Invention

The present invention relates to abase for a motor and a hard disk drive including the same, and more particularly, to a base for a motor capable of preventing foreign objects from being collected in the center of a disk due to air flow, while securing motor rigidity, and a hard disk drive including the same.

2. Description of the Related Art

A hard disk drive (HDD), a computer information storage device, reads data stored on a disk or writes data to the disk using a magnetic head.

In this hard disk drive, abase is installed with a head driver, that is, a head stack assembly (HSA), capable of altering a position of the magnetic head relative to the disk. The magnetic head performs its function while moving to a desired position in a state in which it is suspended at a predetermined height above a writing surface of the disk by the head driver.

According to the related art, in manufacturing a base provided in the hard disk drive, a post-processing scheme of die-casting aluminum (Al) and then removing burrs or the like, generated due to the die-casting, has been used.

However, in the die-casting scheme according to the related art, since a process of injecting molten aluminum (Al) into a die to form a base is performed, high temperature and pressure are required, such that a large amount of energy is required and a process time is increased.

Further, even in terms of a lifespan of a die-casting mold, there is a limitation in manufacturing a large number of bases using a single mold, and a base manufactured in the die-casting process may have poor dimensional precision.

Therefore, in order to solve defects in the die-casting process, the base has been manufactured using press processing. However, in the case of press processing, rigidity of the base is lowered due to characteristics of plate bending and cutting processes.

Therefore, in order to secure rigidity, a thickness of the plate can only be increased. However, in this case, the weight of the base may be increased, thereby not allowing for miniaturization and thinning.

Therefore, research into a technology of securing rigidity of a base while reducing the weight thereof through manufacturing the base by press processing to thereby improve base performance and a lifespan has been urgently demanded.

SUMMARY OF THE INVENTION

An aspect of the present invention provides a base for a motor capable of preventing foreign objects from being collected in the center of a disk due to air flow, while securing motor rigidity, even in the case of being manufactured by press processing, and a hard disk drive including the same.

According to an aspect of the present invention, there is provided abase for a motor, the base including: abase body having a disk disposed thereon; an outer wall part defining an outer part of the base body; and at least one rib depressed from one surface of the base body and protruded toward the other surface thereof to thereby improve rigidity of the base body, wherein pressure in an inner edge of the rib is equal to or greater than pressure in an outer edge thereof at the time of rotation of the disk.

According to another aspect of the present invention, there is provided a base for a motor, the base including: abase body having a disk disposed thereon; an outer wall part defining an outer part of the base body; and at least one rib depressed from one surface of the base body and protruded toward the other surface thereof to thereby improve rigidity of the base body, wherein a depth to which the rib is depressed is changed in order to block an abnormal air flow at the time of rotation of the disk due to the rib.

An air flow toward the center of the disk may be blocked by a difference in the depth of the rib in an axial direction at the time of the rotation of the disk.

The depth to which the rib is depressed in an axial direction may be smaller in an inner edge of the rib than in an outer edge thereof.

The depth to which the rib is depressed in an axial direction may increase in an outer radial direction.

The depth to which the rib is depressed in an axial direction may increase linearly or non-linearly in an outer radial direction.

The rib may be depressed from an upper surface of the base body and protruded toward a lower surface thereof.

The rib may include a plurality of ribs having a radial shape, a helical shape, or a herringbone shape.

The base body may include a rib connecting part connecting outer edges of the plurality of ribs to each other.

According to another aspect of the present invention, there is provided a hard disk drive including: the base for a motor as described above; a spindle motor coupled to the base body to thereby rotate the disk; and a head driver moving a magnetic head to a predetermined position on the disk, the magnetic head writing data to the disk and reproducing data written on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
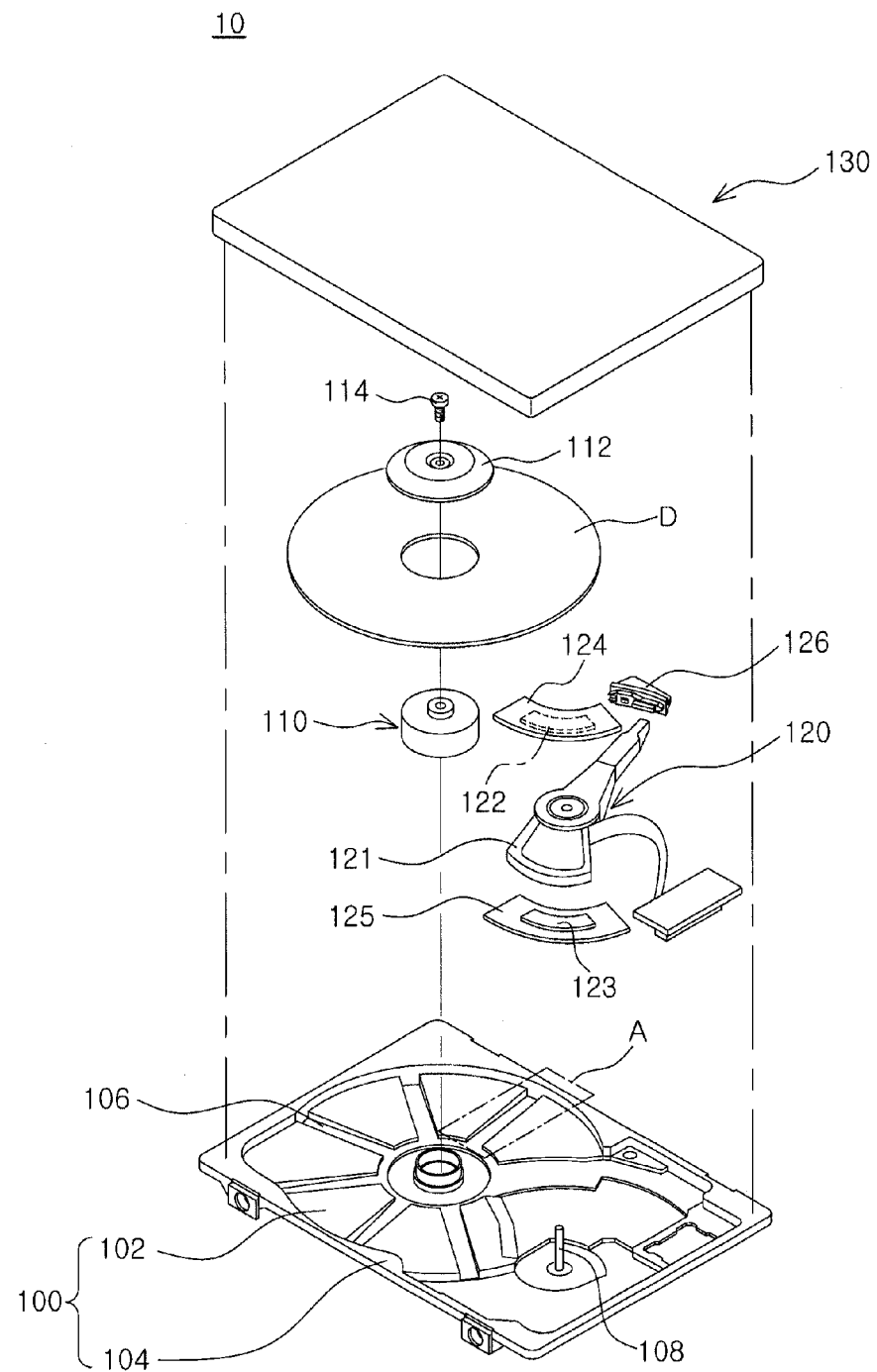
FIG. 1 is a schematic exploded perspective view showing a hard disk drive including a base for a motor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2:
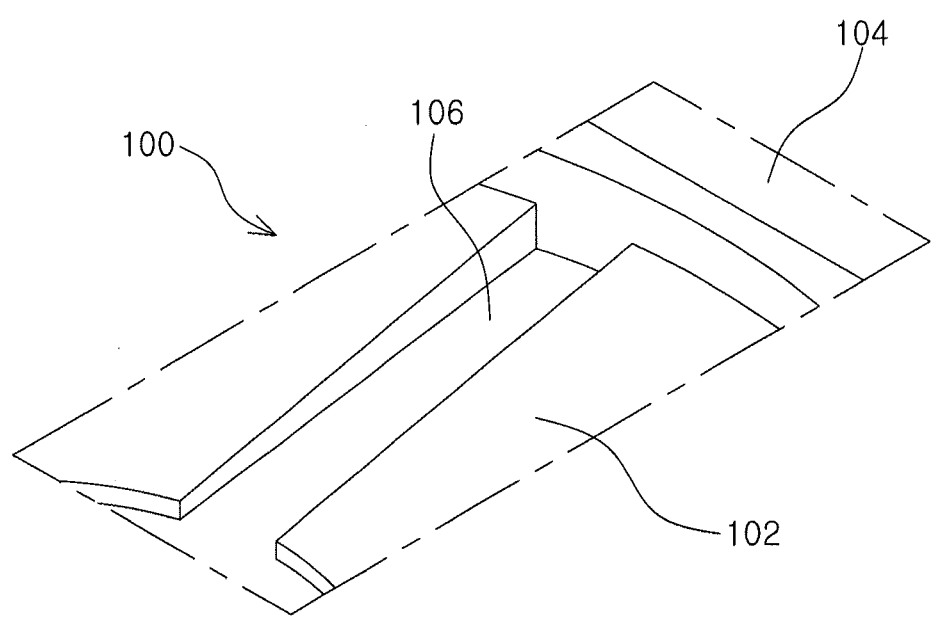
FIG. 2 is a schematic enlarged perspective view of part A of FIG. 1.

FIG. 1 is a schematic exploded perspective view showing a hard disk drive including a base for a motor according to an embodiment of the present invention; and FIG. 2 is a schematic enlarged perspective view of part A of FIG. 1.

Referring to FIGS. 1 and 2, a hard disk drive 10 including a base 100 for a motor according to an embodiment of the present invention may include a base 100 for a motor (hereinafter, referred to as a base), a spindle motor 110, and a head driver 120.

Terms with respect to directions will be first defined. An upward or downward axial direction refers to a direction from an upper surface of the base 100 toward an upper internal surface of a cover 130 or a direction opposite thereto, and an outer or inner radial direction refers to a direction from the center of a disk D toward an outer edge thereof or a direction opposite thereto.

The base 100 may include a base body 102 and an outer wall portion 104, and the base body 120 may provide an internal space in which the spindle motor 110 and the head driver 120 are disposed.

Meanwhile, the base 100 may be a housing forming an external appearance together with a cover 130 in the hard disk drive 10 according to the embodiment of the present invention, and be manufactured to have a basic shape by press processing and then manufactured to have a final shape by additional processing such as bending, cutting, or the like.

That is, the base 100 may be manufactured by performing a single process such as press processing or another process on a cold rolled steel sheet (SPCC, SPCE, or the like) , a hot rolled steel sheet, a stainless steel, a lightweight alloy steel sheet such as a boron or magnesium alloy, unlike the related art post-processing scheme in which aluminum (Al) is die-cast and burrs, or the like generated due to the die-casting are then removed.

Therefore, since the base 100 according to the embodiment of the present invention may be manufactured by the press processing, process time and energy consumption are significantly reduced, whereby productivity may be improved.

However, in the case in which the base 100 is manufactured by press processing, that is, in the case in which the base 100 is manufactured by disposing a plate shaped steel, that is, a cold rolled steel sheet (SPCC, SPCE, or the like) or a hot rolled steel sheet in a press mold and pressing the plate shaped steel at a predetermined pressure, the base 100 can only have a uniform thickness.

Therefore, rigidity of the base body 102 on which a disk D is disposed will inevitably become weak. In order to secure rigidity, the base 100 according to the embodiment of the present invention may include at least one rib 106.

More specifically, the plurality of ribs 106 may be formed to be depressed from one surface of the base body 102 and protruded toward the other surface thereof, thereby having a radial shape.

That is, the rib 106 may be depressed from an upper surface of the base body 102 and protruded toward a lower surface thereof, and may be formed in a direction perpendicular to a rotation direction of the disk D.

Here, a width of the rib 106 in the rotation direction of the disk D is not constant, but may be variously changed in consideration of the relationship between the thickness of the base 100 and the rigidity thereof.

A depth to which the rib 106 is depressed in the axial direction may be changed in order to block an abnormal air flow. Therefore, pressure in an inner edge of the rib 106 may be equal to or greater than pressure in an outer edge thereof.

Meanwhile, in the case in which the depth to which the rib is depressed in the axial direction is constant, when the disk rotates on the base body at a high speed, pressure increases in an outer edge of the base body as compared to an inner edge thereof due to the rotation of the disk.

That is, when the disk is rotated, pressure may increase in the outer radial direction of the disk, which may be generated due to a difference in linear velocity between respective points in a radial direction of the disk.

Here, the pressure difference as described above may cause an abnormal air flow toward the center of the disk, thereby causing a problem that various foreign objects move toward the center of the disk along the rib formed in the base body in order to secure rigidity of the base body.

However, the rib 106 of the base 100 according to the embodiment of the present invention is formed to have pressure in the inner edge thereof equal to or greater than pressure in the outer edge thereof at the time of rotation of the disk D, whereby the above-mentioned problem may be prevented in advance.

In other words, the depth to which the rib 106 is depressed in the axial direction may be changed in order to block the abnormal air flow toward the center of the disk D due to the rib 106. That is, the depth to which the rib 106 is depressed in the inner edge thereof may be smaller than the depth to which the rib 106 is depressed in the outer edge thereof.

More specifically, the depth to which the rib 106 is depressed in the axial direction may increase in the outer radial direction, and an increase ratio in the depth to which the rib 106 is depressed in the axial direction may be linear.

Here, summing up the above-mentioned content, the base 100 manufactured by the press processing can only be have a uniform thickness due to the characteristics of press processing.

Therefore, the base 100 may include at least one rib 106 in order to secure the rigidity of the base body 102 thereof , and the rib 106 may be depressed from the upper surface of the base 100 and protruded toward the lower surface thereof.

In this case, the depth to which the rib 106 is depressed in the axial direction in the outer edge thereof is equal to or deeper than the depth to which the rib 106 is depressed in the axial direction in the inner edge thereof , and the abnormal air flow due to the rib 106 may be blocked.

Therefore, the rib 106 blocks the abnormal air flow while simultaneously securing the rigidity of the base 100 according to the embodiment of the present invention, whereby a phenomenon that foreign objects are collected in the center of the disk D may be prevented in advance.

The outer wall part 104 of the base 100 may be formed along an outer edge of the base body 102 to thereby define the outer part of the base body 102 and may be formed by bending an edge portion of the base body 102.

In other words, the shape of an internal space formed by a combination of upper and lower molds for press or forging corresponds to the shape of the outer wall part 104 and the base body 102, whereby the base 100 according to the embodiment of the present invention may be manufactured by a single process.

However, the base 100 may also be formed to have a basic shape by press processing and be then formed to have a final shape by bending and additional press processing.

In this case, the outer wall part 104 may be formed by being bent downwardly from an outer edge portion of the base body 102 in the axial direction or be formed by being bent upwardly therefrom in the axial direction and then be again bent downwardly in the axial direction.

The spindle motor 110, which is provided to rotate the disk D, may be fixed to the central portion of the base body 102.

The disk D coupled to the spindle motor 110 rotates together with the spindle motor 110 and may have a writing surface to which data is written.

Here, the spindle motor 110 may include a clamp 112 coupled to an upper end portion thereof by a screw 114 in order to firmly fix the disk D thereto.

In addition, although FIG. 1 shows a configuration in which a single disk D is mounted on the spindle motor 110, this configuration is only an example. That is, one or more disks may be mounted on the spindle motor 110.

In the case in which a plurality of disks D are mounted as described above, a ring-shaped spacer for maintaining an interval between the disks D may be disposed between the disks D.

The head driver 120 is called a head stack assembly (HAS) and may be a component having a magnetic head mounted thereon and moving the magnetic head to a predetermined position to thereby write the data to the disk D or read the data stored on the disk D.

In addition, the head driver 120 may move the magnetic head to a predetermined position of the disk D by a voice coil motor (VCM) including a coil 121 and upper and lower magnets 122 and 123.

Here, the upper and lower magnets 122 and 123 disposed on upper and lower portions of the coil 121 provided in the VCM may be coupled to upper and lower yokes 124 and 125, respectively, in order to increase magnetic flux density and be fixed to the base 100.

The VCM may be controlled by a servo control system and rotate the head driver 120 around a pivot axis 108 according to the Fleming' s left hand rule by interaction between current input by the coil 121 provided in the VCM and magnetic fields formed by the upper and lower magnets 122 and 123.

Here, when an operation start command is input to the hard disk drive 10 according to the embodiment of the present invention, the disk D starts to rotate, and the VCM rotates a swing arm in a counterclockwise direction and moves the magnetic head onto the writing surface of the disk D.

On the other hand, when an operation stop command is input to the hard disk drive according to the embodiment of the present invention, the VCM rotates the swing arm in a clockwise direction to thereby allow the magnetic head to deviate from the disk D.

The magnetic head deviating from the writing surface of the disk D is parked on a ramp 126 provided outside of the disk D.

Here, the ramp 126 may allow the magnetic head to be spaced apart from the disk D by a predetermined interval in the case in which the magnetic head moves to the disk D, while simultaneously parking the magnetic head, whereby data of the disk D may be stably read.

Figure 3:
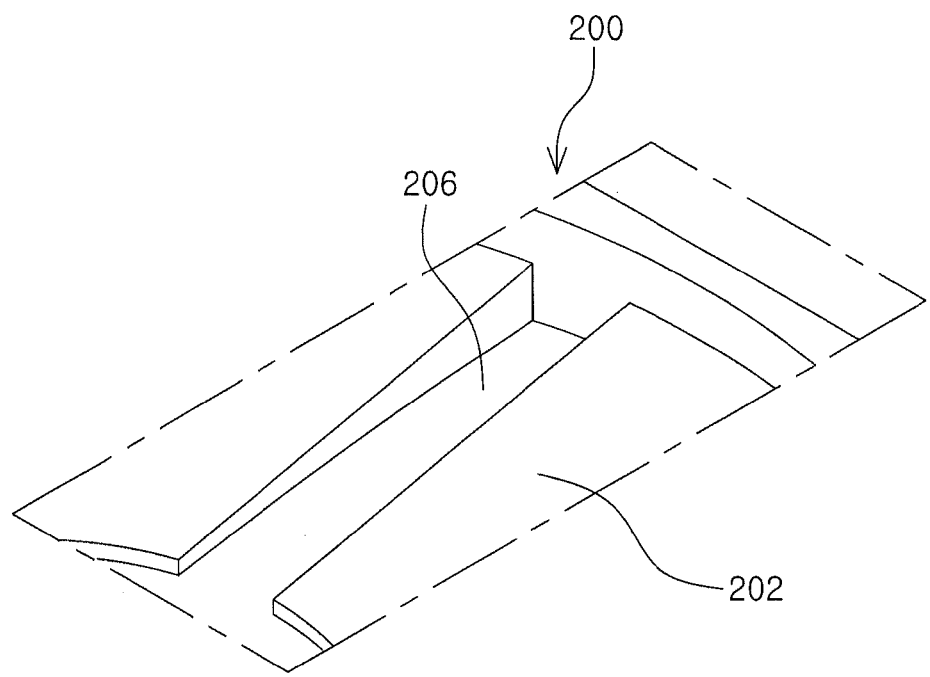
FIG. 3 is a schematic enlarged perspective view showing a modified example of part A of FIG. 1.

FIG. 3 is a schematic enlarged perspective view showing a modified example of part A of FIG. 1.

Referring to FIG. 3, a depth to which a rib 206 formed in a base body 202 of a base 200 is depressed in the axial direction may be changed in order to block an abnormal air flow due to the rib 206.

That is, the depth to which the rib 206 is depressed in the axial direction may be smaller in an inner edge thereof than in an outer edge thereof and increase non-linearly in the outer radial direction.

Therefore, since pressure in the inner edge may be equal to or greater than pressure in the outer edge at the time of rotation of the disk D due to the rib 206 as described above, movement of foreign objects toward the central portion of the disk D may be prevented.

Figure 4:
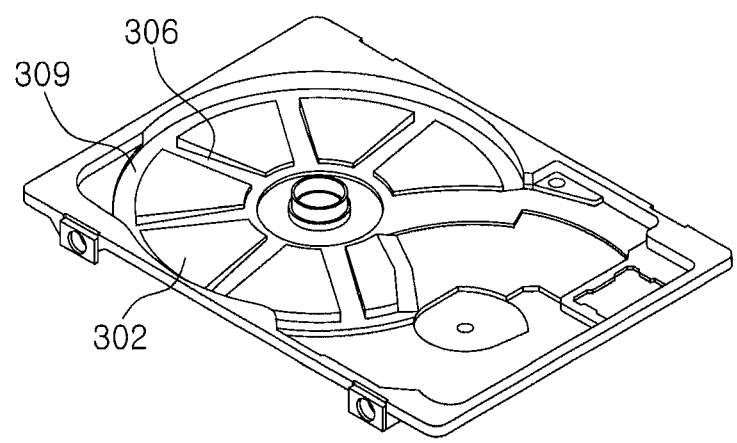
FIG. 4 is a schematic enlarged perspective view showing abase for a motor according to another embodiment of the present invention.

FIG. 4 is a schematic enlarged perspective view showing a base for a motor according to another embodiment of the present invention.

Referring to FIG. 4, a base 300 for a motor according to another embodiment of the present invention has the same components and effect as those of the base 100 or 200 according to the above-mentioned embodiment of the present invention described with reference to FIGS. 1 through 3, except for a rib connecting part 309. Therefore, descriptions of the same components except for the rib connecting part 309 will be omitted.

The rib connecting part 309 may connect a plurality of ribs 306 for securing rigidity of abase body 302 to each other and serve as a movement path allowing foreign objects that may be present in the hard disk drive 10 to be collected in a collecting part (not shown) disposed outside of the disk D.

In other words, the rib connecting part 309 may be a kind of groove depressed downwardly in the axial direction along an outer edge of the disk D so as to connect outer edges of the ribs 306 formed in the base body 302 to each other.

That is, the lib connecting part 309 may be depressed from an upper surface of the base body 302 and protruded toward a lower surface thereof, similar to the rib 306, and be formed in the outer radial direction of the rib 306.

Here, in the rib connecting part 309, an abnormal air flow is not generated at the time of rotation of the disk D due to a difference in depth to which the rib 306 is depressed in the axial direction as described above with reference to FIGS. 1 through 3, and an air flow is generated in a rotation direction of the disk D. Therefore, the foreign objects that may be present in the hard disk drive 10 may be stably collected in the collecting part disposed outside of the disk D.

Figure 5:
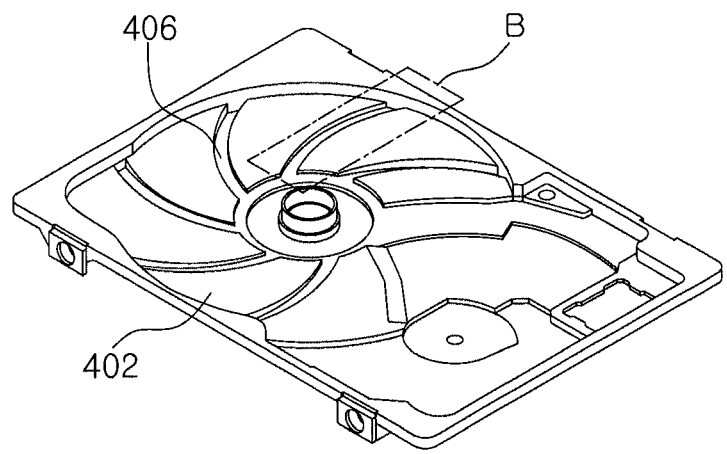
FIG. 5 is a schematic enlarged perspective view showing abase for a motor according to another embodiment of the present invention.
Figure 6:
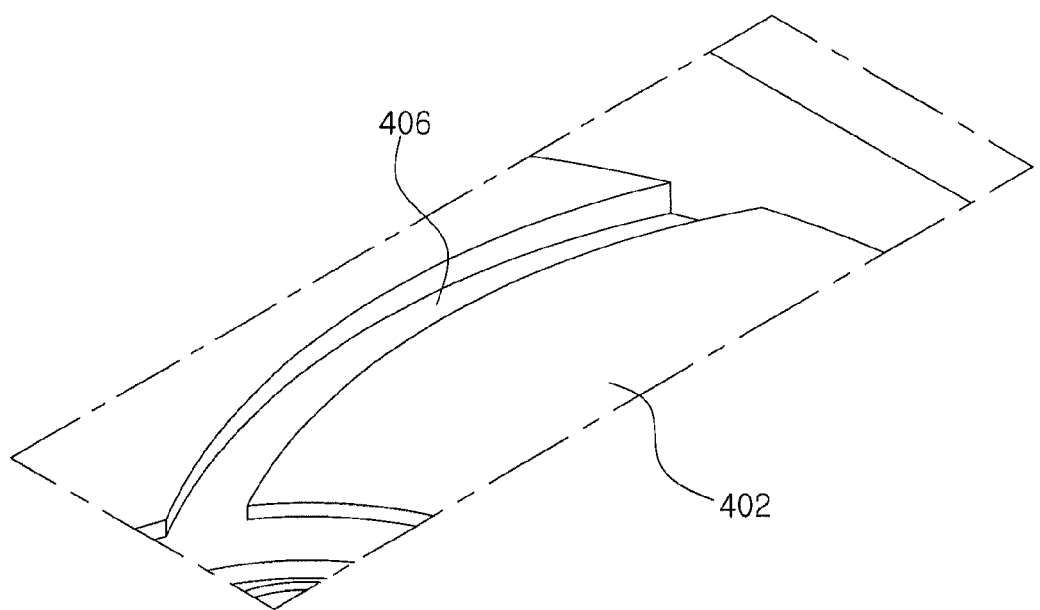
FIG. 6 is a schematic enlarged perspective view of part B of FIG. 5.

FIG. 5 is a schematic enlarged perspective view showing a base for a motor according to another embodiment of the present invention; and FIG. 6 is a schematic enlarged perspective view of part B of FIG. 5.

Figure 7:
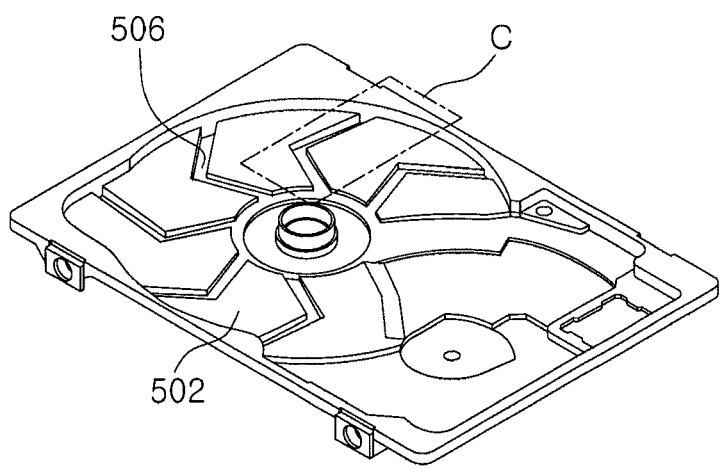
FIG. 7 is a schematic enlarged perspective view showing a base for a motor according to another embodiment of the present invention.
Figure 8:
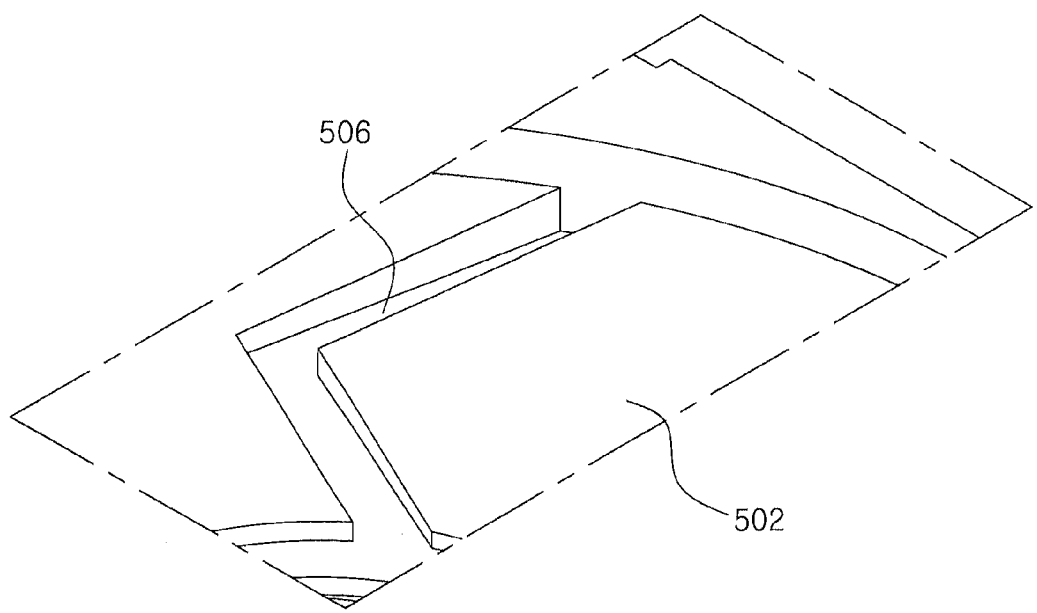
FIG. 8 is a schematic enlarged perspective view of part C of FIG. 7.

In addition, FIG. 7 is a schematic enlarged perspective view showing a base for a motor according to another embodiment of the present invention; and FIG. 8 is a schematic enlarged perspective view of part C of FIG. 7.

A base 400 or 500 for a motor according to another embodiment of the present invention shown in FIGS. 5 through 8 has the same components and effect at those of the base for a motor according the above-mentioned embodiments of the present invention, except for a shape of a rib 406 or 506. Therefore, descriptions of the same components except for the shape of the rib 406 or 506 will be omitted.

The rib 406 or 506 may be depressed from an upper surface of a base body 402 or 502 and protruded toward a lower surface thereof, and may have a spiral shape (See FIGS. 5 and 6) or a herringbone shape (See FIGS. 7 and 8).

Rigidity of the base body 402 or 502 may increase due to the rib 406 or 506 having the above-mentioned shape, and an abnormal air flow that may be generated at the time of rotation of the disk D may be prevented due to a difference in depth to which the rib is depressed in the axial direction.

Although not shown, the base 400 or 500 may be connected to the rib connecting part 309 described above with reference to FIG. 4.

As set forth above, in a base assembly for a motor and a hard disk drive including the same according to embodiments of the present invention, rigidity of the base may be improved even in the case of using press processing.

In addition, an abnormal air flow generated due to a rib for securing rigidity can be prevented, whereby performance and a lifespan of the base may be significantly improved.

Further, the base is manufactured by press processing to significantly reduce a process time and energy consumption, whereby productivity may be improved.

While the present invention has been shown and described in connection with the embodiments, it will be apparent to those skilled in the art that modifications and variations can be made without departing from the spirit and scope of the invention as defined by the appended claims.

What is claimed is:

1. A base for a motor, the base comprising:
a base body having a disk disposed thereon;
an outer wall part defining an outer part of the base body; and
a plurality of ribs depressed from one surface of the base body and protruded toward the other surface thereof to thereby improve rigidity of the base body, the ribs extending in directions perpendicular to a rotation direction of the disk,
wherein pressure in an inner edge of the ribs is equal to or greater than pressure in an outer edge thereof at the time of rotation of the disk,
the base body including a rib connecting part connecting outer edges of the plurality of ribs to each other and depressed downwardly in an axial direction along an outer edge of the disk.

2. The base of claim 1, wherein an air flow toward the center of the disk is blocked by a difference in a depth of the rib in an axial direction at the time of the rotation of the disk.

3. The base of claim 1, wherein a depth to which the rib is depressed in an axial direction is smaller in an inner edge of the rib than in an outer edge thereof.

4. The base of claim 1, wherein a depth to which the rib is depressed in an axial direction increases in an outer radial direction.

5. The base of claim 1, wherein a depth to which the rib is depressed in an axial direction increases linearly or non-linearly in an outer radial direction.

6. The base of claim 1, wherein the rib is depressed from an upper surface of the base body and protruded toward a lower surface thereof.

7. The base of claim 1, wherein the rib comprises a plurality of ribs having a radial shape, a spiral shape, or a herringbone shape.

8. A hard disk drive comprising:
the base for a motor of claim 1;
a spindle motor coupled to the base body to thereby rotate the disk; and
a head driver moving a magnetic head to a predetermined position on the disk, the magnetic head writing data to the disk and reproducing data written on the disk.

9. A base for a motor, the base comprising:
a base body having a disk disposed thereon;
an outer wall part defining an outer part of the base body; and
a plurality of ribs depressed from one surface of the base body and protruded toward the other surface thereof to thereby improve rigidity of the base body, the ribs extending in directions perpendicular to a rotation direction of the disk,
wherein a depth to which the ribs are depressed is changed in order to block an abnormal air flow due to the ribs at the time of rotation of the disk,
the base body including a rib connecting part connecting outer edges of the plurality of ribs to each other and depressed downwardly in an axial direction along an outer edge of the disk.

10. The base of claim 9, wherein an air flow toward the center of the disk is blocked by a difference in the depth of the rib in an axial direction at the time of the rotation of the disk.

11. The base of claim 9, wherein the depth to which the rib is depressed in an axial direction is smaller in an inner edge of the rib than in an outer edge thereof.

12. The base of claim 9, wherein the depth to which the rib is depressed in an axial direction increases in an outer radial direction.

13. The base of claim 9, wherein the depth to which the rib is depressed in an axial direction increases linearly or non-linearly in an outer radial direction.

14. The base of claim 9, wherein the rib is depressed from an upper surface of the base body and protruded toward a lower surface thereof.

15. The base of claim 9, wherein the rib comprises a plurality of ribs having a radial shape, a spiral shape, or a herringbone shape.

16. A hard disk drive comprising:
the base for a motor of claim 9;
a spindle motor coupled to the base body to thereby rotate the disk; and
a head driver moving a magnetic head to a predetermined position on the disk, the magnetic head writing data to the disk and reproducing data written on the disk.

* * * * *